United States Patent
MacKay et al.

(10) Patent No.: US 10,361,957 B1
(45) Date of Patent: Jul. 23, 2019

(54) PREDICTING OPTICAL SPECTRAL PROFILES IN ADVANCE OF CAPACITY CHANGES IN OPTICAL NETWORKS

(71) Applicant: Ciena Corporation, Hanover, MD (US)

(72) Inventors: Alex W. MacKay, Ottawa (CA); Choudhury A. Al Sayeed, Stittsville (CA); David C. Bownass, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/892,528

(22) Filed: Feb. 9, 2018

(51) Int. Cl.
| *H04B 10/07* | (2013.01) |
| *H04L 12/801* | (2013.01) |
| *H04B 10/079* | (2013.01) |
| *H04B 10/27* | (2013.01) |
| *H04L 12/24* | (2006.01) |

(52) U.S. Cl.
CPC ....... *H04L 47/127* (2013.01); *H04B 10/0793* (2013.01); *H04B 10/27* (2013.01); *H04L 41/145* (2013.01); *H04L 41/147* (2013.01)

(58) Field of Classification Search
CPC .......... H04B 10/07955; H04B 10/0791; H04J 14/021
See application file for complete search history.

(56) References Cited

U.S. PATENT DOCUMENTS

| 5,712,716 A * | 1/1998 | Vanoli .................. H04B 10/077 398/26 |
| 9,252,913 B2 | 2/2016 | Al Sayeed et al. |
| 9,276,696 B2 | 3/2016 | Al Sayeed et al. |
| 9,419,708 B2 | 8/2016 | Rad et al. |
| 9,577,763 B2 | 2/2017 | Al Sayeed et al. |
| 9,806,803 B2 * | 10/2017 | Bownass ............ H04B 10/0795 |
| 9,985,726 B1 * | 5/2018 | Al Sayeed ............ H04J 14/021 |
| 2015/0117858 A1 * | 4/2015 | Al Sayeed ....... H04B 10/07955 398/38 |
| 2017/0019171 A1 | 1/2017 | Doucet et al. |
| 2017/0085316 A1 | 3/2017 | Al Sayeed et al. |
| 2017/0099530 A1 | 4/2017 | Swinkels et al. |
| 2017/0117983 A1 | 4/2017 | Al Sayeed et al. |

* cited by examiner

*Primary Examiner* — Dzung D Tran
(74) *Attorney, Agent, or Firm* — Clements Bernard Walker PLLC; Christopher L. Bernard; Lawrence A. Baratta, Jr.

(57) ABSTRACT

Systems and methods for preconditioning an optical spectrum through predicting optical spectral profiles in advance of capacity changes in an optical section include obtaining data associated with the optical section to model a current state of spectral loading in the optical section; responsive to a proposed capacity change in the current state of spectral loading, estimating a future state of spectral loading which includes the capacity change; and causing changes to one or more settings in the optical section to achieve an optimized spectral loading for the future state of spectral loading.

20 Claims, 12 Drawing Sheets

PREDICTING OPTICAL SPECTRAL PROFILES IN ADVANCE OF CAPACITY CHANGES IN OPTICAL NETWORKS

FIELD OF THE DISCLOSURE

The present disclosure generally relates to fiber optic transmission systems and methods. More particularly, the present disclosure relates to systems and methods for predicting optical spectral profiles in advance of capacity changes (channel adds or deletes) including in-service channels for the purpose of reducing time to add/delete/optimize over a capacity change.

BACKGROUND OF THE DISCLOSURE

In Layer 0 optical networks, the time required to restore traffic channels is primarily dominated by the channel add time on the restoration path. The channel additions onto a lit optical path that already contains in-service channels are traditionally slow. This is due to the fact that, (1) for each Optical Multiplex Section (OMS), the new capacity addition needs to be controlled in order to minimize any power or Optical Signal to Noise Ratio (OSNR) impact on the already in-service channels on that section, and (2) the channel add operation from one OMS to the next needs to be sequential or pseudo-sequential in nature. The OMS is an all-optical section of an optical network between Optical Add/Drop Multiplexers (OADM), and each OMS has the property of having the same number of ingress and egress channels. The OMS may also be referred to as an optical section.

While adding in an OMS, two factors require attention: (1) the fast-transient impact on in-service channels' power and OSNR due to control loops of optical amplifiers, and (2) the steady-state power offsets (overshoots or undershoots from their optimal launch power targets to the fibers), and hence, OSNR impact on the in-service channels due to non-linear gain transfers over the photonic section due to Stimulated Raman Scattering (SRS) in optical fibers and Spectral Hole Burning (SHB) in Erbium-Doped Fiber Amplifiers (EDFAs). The fast-transient impact can be mostly minimized by introducing new channels on the path at a slow rate of 100's of milliseconds. To minimize the steady-state power offset, new channels are introduced in a controlled manner in several incremental power-add steps or in channel bundles, and between each incremental step or bundle, control algorithms are run to change the per channel actuators or amplifier gains to eliminate the incurred offset. Most of the time spent on adding channels in an OMS are to minimize the steady-state offset on in-service channels that typically takes seconds to tens of seconds.

As mentioned above, the channel add in downstream OMSs are typically either sequential or pseudo-sequential with respect to the channel add taking place in upstream OMSs. This is because the downstream OMS must wait for steady per channel input power coming from upstream prior to setting actuators to avoid setting incorrect target attenuations and gain. Hence, a capacity change operation through a cascade of OMSs is sequential, and in some cases, it is possible to reduce this to a pseudo-sequential operation using adaptive controller settings. If the attenuation targets in each OMS are preset to try to achieve a fast capacity change or restoration without considering the nonlinear gain transfers, it is common that the attenuation targets in each OMS would be very incorrect leading to non-optimal performance, which can then take a significant amount of time to reoptimize cascaded sections end-to-end leading to instability. Such large inaccuracy in attenuation settings at each OMS section leads to overshoots or undershoots to launch powers into the fiber that not only impacts the Signal to Noise Ratio (SNR) of the newly adding channels, but also creates the risk of impacting the available SNR margin of the in-service channels (e.g., by stealing gain through SRS thereby, reducing power and OSNR, or by giving too much power and introducing Self Phase Modulation (SPM) penalties, or even through channel-to-channel nonlinearities such as Cross Phase Modulation (XPM) and Four Wave Mixing (FWM) in the case of higher than expected neighboring channel powers). Therefore, channel additions over an optical path are primarily sequential, and Reconfigurable Optical Add/Drop Multiplexer (ROADM) hop dependent.

The issue of significant non-linear gain transfer over a capacity change is largely minimized when a system operates close to a full-fill spectral loading condition, and one option is always to load the system using "dummy" channel holders typically composed of carved Amplified Spontaneous Emission (ASE) which can then be swapped for real channels at a later time. This approach requires additional networkwide hardware installation and hence, impact on capital expenditure in day one installation. Design consideration also needs to be adjusted for the hardware failure scenarios with channel holders, where the source of "dummy" channels can fail for an optical section, leading to channel additions back to the traditional way. In addition, the presence of ASE channel holders gives the worst-case performance margin in cases that are not fully filled, since, in this scenario, there are always full fill interferers that can significantly increase nonlinear impairments compared to a partially loaded system. This can prevent capacity mining of unused performance margin and operators tend not to want to operate at the worst-case performance margin when not required.

Accordingly, it would be advantageous to address the nonlinear gain transfer without using "dummy" channels to achieve path independent Layer 0 timing to add/delete/optimize over a capacity change.

BRIEF SUMMARY OF THE DISCLOSURE

In an embodiment, a method for preconditioning optical spectrum through predicting optical spectral profiles in advance of capacity changes in an optical section includes obtaining data associated with the optical section to model a current state of spectral loading in the optical section; responsive to a proposed capacity change in the current state of spectral loading, estimating a future state of spectral loading which includes the capacity change; and causing changes to one or more settings in the optical section to achieve an optimized spectral loading for the future state of spectral loading. The proposed capacity change can be implemented subsequent to the changes to the one or more settings in the optical section. The changes can be provided to one or more actuators in the optical section. The estimating can include determining a change in the future state of spectral loading due to Stimulated Raman Scattering (SRS), Spectral Hole Burning (SHB), amplifier gain ripple, and amplifier gain tilt. The estimating can treat each nonlinear effect as a separable perturbation in an approximately linear transfer function to determine the estimated future state of spectral loading. The estimating can utilize interpolation/extrapolation of already in-service channels' power in the absence of modeled data. The method can further include providing the estimated future state of spectral loading to a downstream optical section for preconditioning therein. The method can be implemented via a controller connected to the optical section.

In another embodiment, a controller connected to an optical section and configured to precondition optical spectrum through predicting optical spectral profiles in advance of capacity changes in the optical section includes a processor; and memory storing instructions that, when executed, cause the processor to obtain data associated with the optical section to model a current state of spectral loading in the optical section, estimate a future state of spectral loading which includes the capacity change responsive to a proposed capacity change in the current state of spectral loading, and cause changes to one or more settings in the optical section to achieve an optimized spectral loading for the future state of spectral loading. The proposed capacity change can be implemented subsequent to the changes to the one or more settings in the optical section. The changes can be provided to one or more actuators in the optical section. The estimated future state of spectral loading can be based on a determination of a change in the future state of spectral loading due to Stimulated Raman Scattering (SRS), due to Spectral Hole Burning (SHB), amplifier gain ripple, and amplifier gain tilt. The estimated future state of spectral loading can treat each nonlinear effect as a separable perturbation in an approximately linear transfer function to determine the estimated future state of spectral loading. The memory storing instructions that, when executed, can further cause the processor to provide the estimated future state of spectral loading to a downstream optical section for preconditioning therein.

In a further embodiment, an apparatus connected to an optical section and configured to precondition optical spectrum through predicting optical spectral profiles in advance of capacity changes in the optical section includes circuitry configured to obtain data associated with the optical section to model a current state of spectral loading in the optical section; circuitry configured to estimate a future state of spectral loading which includes the capacity change responsive to a proposed capacity change in the current state of spectral loading; and circuitry configured to cause changes to one or more settings in the optical section to achieve an optimized spectral loading for the future state of spectral loading. The proposed capacity change can be implemented subsequent to the changes to the one or more settings in the optical section. The changes can be provided to one or more actuators in the optical section. The estimated future state of spectral loading can be based on a determination of a change in the future state of spectral loading due to Stimulated Raman Scattering (SRS), due to Spectral Hole Burning (SHB), amplifier gain ripple, and amplifier gain tilt. The estimated future state of spectral loading can treat each nonlinear effect as a separable perturbation in an approximately linear transfer function to determine the estimated future state of spectral loading. The apparatus can further include circuitry configured to provide the estimated future state of spectral loading to a downstream optical section for preconditioning therein.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
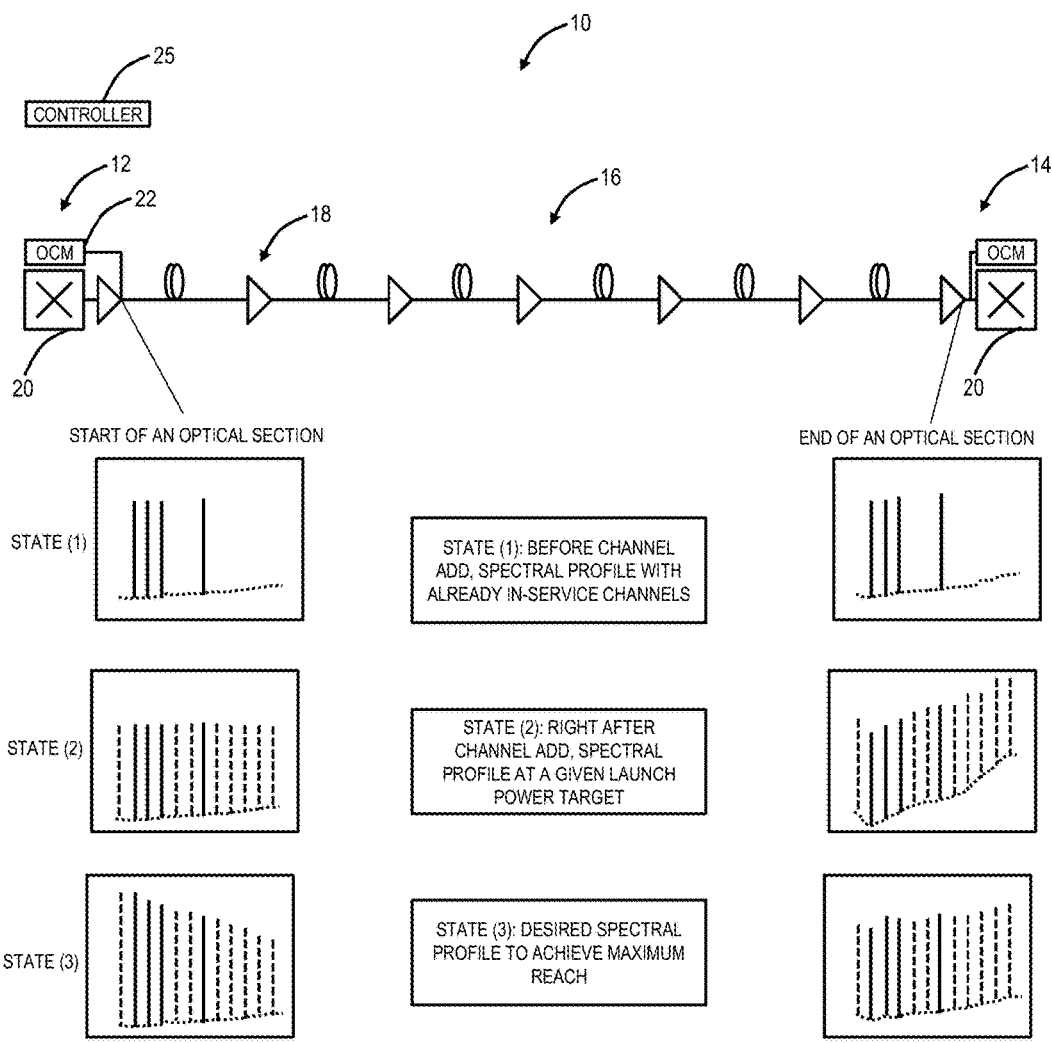
FIG. 1 is a network diagram of an optical section in an optical network and associated graphs illustrating optical spectrum at the start and end of the optical section before and after a capacity change.

The present disclosure relates to systems and methods for predicting optical spectral profiles in advance of capacity changes (channel adds or deletes) including in-service channels for the purpose of reducing time to add/delete/optimize over a capacity change. Again, achieving Layer 0 restoration in seconds remains a significant challenge that is primarily limited by the uncertainty in how in-service channel power and OSNR will be perturbed by newly added/restored channels due to cascaded non-linear gain transfer in the system (primarily due to SRS in fibers and SHB in EDFAs) as well as the combination with linear gain transfer functions such as amplifier gain ripple and dynamic gain tilt. Due to this uncertainty, adding new channels or restoration in Layer 0 is traditionally slow, and follows a sequential or pseudo-sequential approach between OADM controllers to ensure that traffic affecting power and OSNR perturbations on the in-service channels does not occur.

The systems and methods accurately predict the non-linear gain transfers of an optical section in real-time based on measured data points to allow the controllers to predict the required changes in spectral profile for both adding and in-service channels before the actual capacity change (channel add or delete) takes place. This allows each sectional controller (or a centralized controller) to pre-set the optical path by adjusting the per channel and common (for all channels) actuators at the same time when the adding channels topologies are set, which will be before the optical power from adding channels show up in the path. In this way, the systems and methods achieve a path-independent Layer 0 optical path setup time and hence, a path irrespective restoration time, while maintaining stability in the line system by accurately predicting power changes and taking proactive actions to any overshoots or undershoots for adding or deleting channels and resulting instabilities in the line system.

More specifically, the systems and methods set up the optical path end-to-end right before any capacity change takes place. The step that allows this to take place is the pre-estimation of changes in gain and OSNR in the entire path using calculations in each section. Subsequent to the pre-estimation of the changes, the end-to-end setting of actuators for both in-service and to-be-added (or to-be-deleted) channels (and common full-band actuators) can be adjusted in anticipation of the light appearing in such a way as to achieve the goal of minimizing the OSNR/SNR impact on existing channels. This is effectively a feed-forward design in a highly non-linear optical environment.

Advantageously, the systems and methods predict an optimal spectral profile with accuracy per OMS to maximize reach, considering non-linear gain transfers over an optical section on expected spectral loading changes, in real-time with measured data points before the spectral change takes place, and without any channel fill from dummy channels or channel holders. Due to non-linearity, it has been a long due challenge to be solved, and a fast, simple, empirical model is presented herein that can work in-skin in real-time to support fast running control applications in the photonic line system. The systems and methods consider the non-linear gain model and utilize that to precondition the optical path for new channels without performance impact on the in-service channels. This allows a Layer 0 restoration time independent of the number of OADM hops within an optical path. That is, the Layer 0 restoration time for setting up the optical link always remains the same (in seconds) regardless of the selected restoration path.

FIG. 1 is a network diagram of an optical section 10 in an optical network and associated graphs illustrating optical spectrum at the start and end of the optical section 10 before and after a capacity change. The optical section 10 (which can also be referred to as an OMS) includes two OADM nodes 12, 14 interconnected via an optical link 16 which includes one or more amplifiers 18 (e.g., post amplifiers, intermediate line amplifiers, pre-amplifiers, etc.). The optical section 10 is shown for illustration purposes as a single link 16 from the node 12 to the node 14. Of course, there can be another link providing bidirectional communication between the nodes 12, 14. The OADM nodes 12, 14 can include various optical equipment such as Wavelength Selective Switches (WSSs) 20, multiplexers/demultiplexers, optical modems for local add/drop, etc. Also, each OADM node 12, 14 can include an Optical Channel Monitor (OCM) 22 which can tap off a portion of optical power and provide visibility to the optical spectrum. Those skilled in the art will recognize there can be various other equipment which is omitted for illustration purposes.

Again, the systems and methods focus on developing an algorithm to estimate the impact of non-linear gain transfers over the optical section 10 without any necessity of filling up the optical spectrum with "dummy" channels or channel holders. The systems and methods allow pre-estimating the power and OSNR level of any newly added channels at the end of the optical section 10. This allows predicting the impact on the in-service channels well before the capacity changes taking place and hence, taking proactive actions during capacity changes to mitigate the overall impacts on their SNR margin and channel power.

The optical section 10 includes various actuators in the optical path which can adjust optical power including, for example, WSS per channel attenuators which operate on a per channel basis and common actuators which operate across the optical spectrum such as amplifier target gains and gain tilt. With the systems and methods, all actuators in the optical path can be adjusted during the capacity change or before the capacity change takes place since the power and OSNR of the channels after the capacity change can be accurately pre-estimated at the end of each optical section 10 regardless of the number of spans, amplifiers, and channel locations in each section. This capability of dead reckoning of add channel powers, and pre-adjusting the optical path allows to eliminate the time overhead used to be required for settling the steady-state power offsets in each optical section 10 and achieves Layer 0 restoration in seconds irrespective of the number of ROADM hops in the path. Since the systems and methods can predict the power and OSNR impact and hence, the overall SNR margin impact on existing in-service channels due to non-linear events during a capacity change and the ability to minimize them through actuator changes, the knowledge can additionally be used to decide, whether such fast layer 0 restoration method will be appropriate for an optical path to avoid any potential service impact on existing channels.

The optical section 10 includes a controller 25 which can be a sectional optical controller, a centralized optical controller, etc. The controller 25 is a processing element which connects to the nodes 12, 14 and the various components in the optical section 10. The controller 25 is configured to implement the systems and methods described herein including obtaining data from the optical section 10, predicting the non-linear gain transfers of the optical section 10 in real-time based on measured data points, and performing the required changes in spectral profile for both adding and in-service channels before the actual capacity change (channel add or delete) takes place. That is, the controller 25 can in part control the settings of the various actuators in the optical path.

Various graphs in FIG. 1 illustrate optical spectral loading at the start of the optical section 10 and at the end of the optical section 10, e.g., at the OCMs 22. The optical spectral loading is shown in three states (1), (2), (3) to depict the course of actions during a channel add over the optical section 10. State (1) defines the spectral loading (power and OSNR) state with in-service channels at the start and end of the optical section 10. That is, State (1) is before channel add, and the current spectral loading with in-service channels, the spectral locations of newly added channels, their target launch power profile, and sectional topology information are known. State (2) describes the spectral loading condition right after a channel add, when all channels are added in one step to a given launch power target at each fiber span, and no other control operations are run to mitigate the offset on the in-service and adding channels. State (3) shows an example of spectral loading state when the whole optical section 10 is optimized for maximum capacity and reach (such as OSNR flatness or tilted OSNR, or biased OSNR to give preference to specific channels or spectrum).

The objective of the systems and methods is effectively to skip the State (2) and go directly from State (1) to State (3) over a capacity change, since State (2) can cause traffic impacts on in-service channels and the time required to optimize from State (2) to State (3) can be long.

Figure 2:
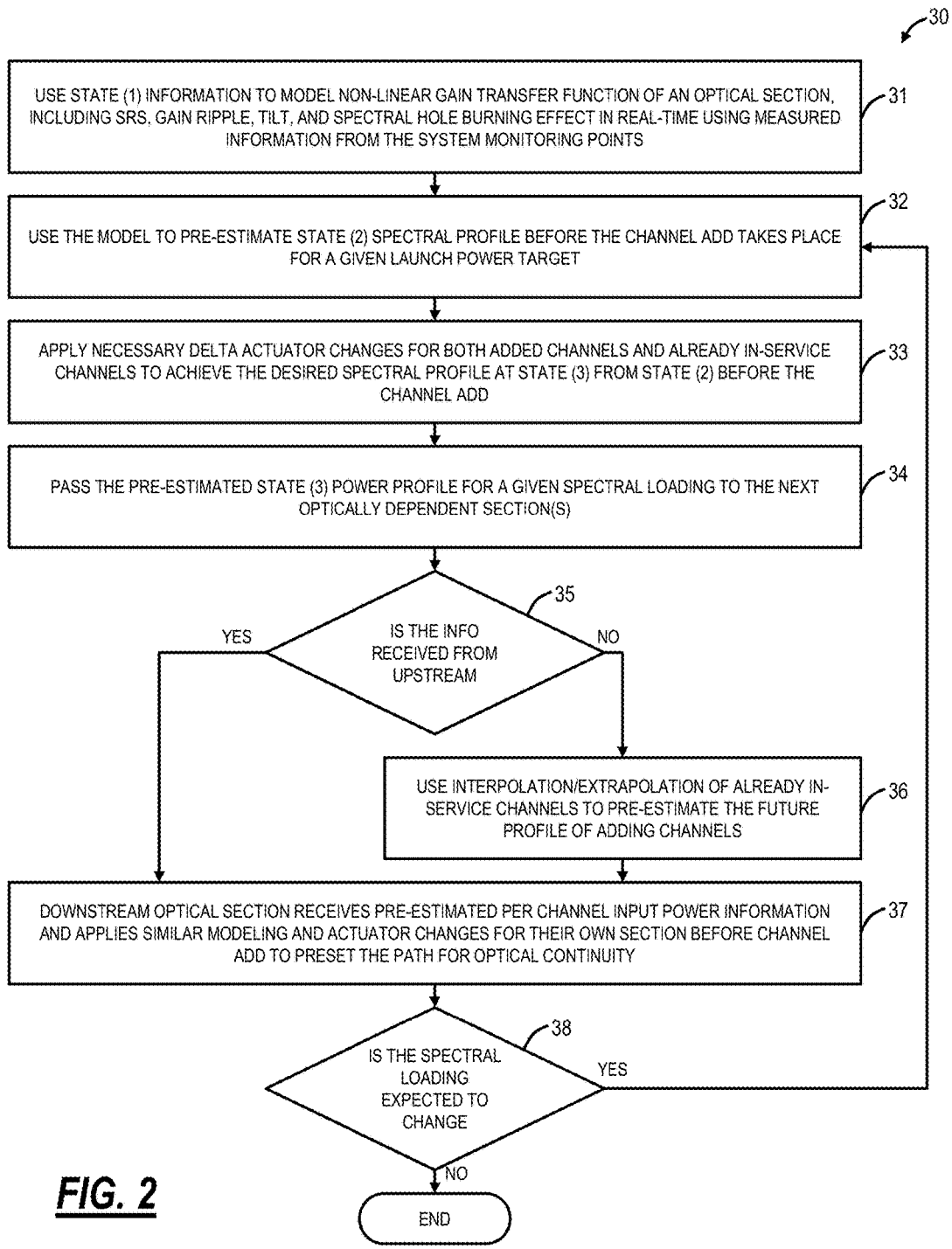
FIG. 2 is a flowchart of a process for accurately estimating the per channel power and OSNR at the end of an optical section for both adding and in-service channels for an expected change in spectral loading before the actual change takes place.

FIG. 2 is a flowchart of a process 30 for accurately estimating the per channel power and OSNR at the end of an optical section for both adding and in-service channels for an expected change in spectral loading before the actual change takes place. The advantage of dead reckoning (i.e., predicting the add channel power and OSNR before actual add) allows controllers running on each optical section 10 to preset the per channel actuators (such as target attenuations, switch selectors, control mode of operations, etc.), and common actuators (such as amplifier gain, total output power clamp, and tilt settings) to their desired settings that sets up the optical path end-to-end right before the channel add takes place. Since the attenuations are already set considering the real-time non-linear gain transfers into account in addition to other propagation factors (such as preceding span loss), and at the source node 12, channel powers are introduced in 100's of milliseconds range, the combination of both eliminates any transient and steady-state power offset impact on the in-service channels, as well as, mitigates any possibilities for encountering overshoots and undershoots for the adding channels into the fiber, which was not a possibility before with pre-setting optical path.

The process 30 includes using state (1) information to model a non-linear gain transfer function of the optical section 10, including SRS, gain ripple, tilt, and SHB effects in real-time using measured information from system monitoring points (e.g., the OCMs 22) (step 31). The process 30 includes using the model to pre-estimate the state (2) spectral profile before the channel add takes place for a given launch power target (step 32). Next, the process 30 includes applying the necessary delta actuator changes for both added channels and already in-service channels to achieve the desired spectral profile at state (3) from state (2), before the actual channels are added (step 33). The process includes passing the pre-estimated state (3) power profile for a given spectral loading to the next optically dependent section(s) (step 34).

The process 30 can check if the info was received from an upstream controller (step 35) and, if not, the process 30 can use interpolation/extrapolation of already in-service channels to pre-estimate the future profile of adding channels (step 36). If the info was received (step 35) or after step 36, the process includes the downstream optical section receiving the pre-estimated per channel input power information and applying similar modeling and actuator changes from their own section before the channel add to preset the path for optical continuity (step 37). If the spectral loading is expected to change (step 38), the process 30 returns to step 32 with the changes modeled. If not, the process 30 ends.

Effects on In-Service Channels During a Capacity Change

Again, changes in spectral loading can result in changes to already in-service channels, such as illustrated in FIG. 1 with respect to states (1), (2), and (3). The dominant effects include amplifier gain ripple and tilt—different channel loadings will result in different wavelength dependent gain due to the fact that the average gain is equal to target gain for a gain-controlled EDFA; SRS which transfers gain from high frequency channels to low frequency channels and can give large gain perturbations especially at high channel count and/or launch powers; and SHB in EDFAs which distorts the gain spectrum of amplifiers based on current channel loading. For example, for amplifier gain ripple and tilt, consider a case of single channel at one edge of the C-band with 1 dB tilt across the amplifier and target Gain of $G_{targ}$, when full fill channels are added, the gain of the channel will change from $G_{targ}$ to $G_{targ} \pm 0.5$ dB(tilt)+excess ripple and dynamic gain tilt shape.

The in-service channel power and OSNR over a capacity change can increase or decrease depending upon the dominant effects occurring over the capacity change. A reduced net gain results in lower OSNR for those channels and can even result in losing sufficient power at a receiver in extreme cases. Overshoots can result in non-linear impairments (especially self/cross phase modulation). The magnitude of the perturbation depends on the number of amplifiers and the spectral placement of the existing and newly added channels.

Stimulated Raman Scattering (SRS)

Figure 3:
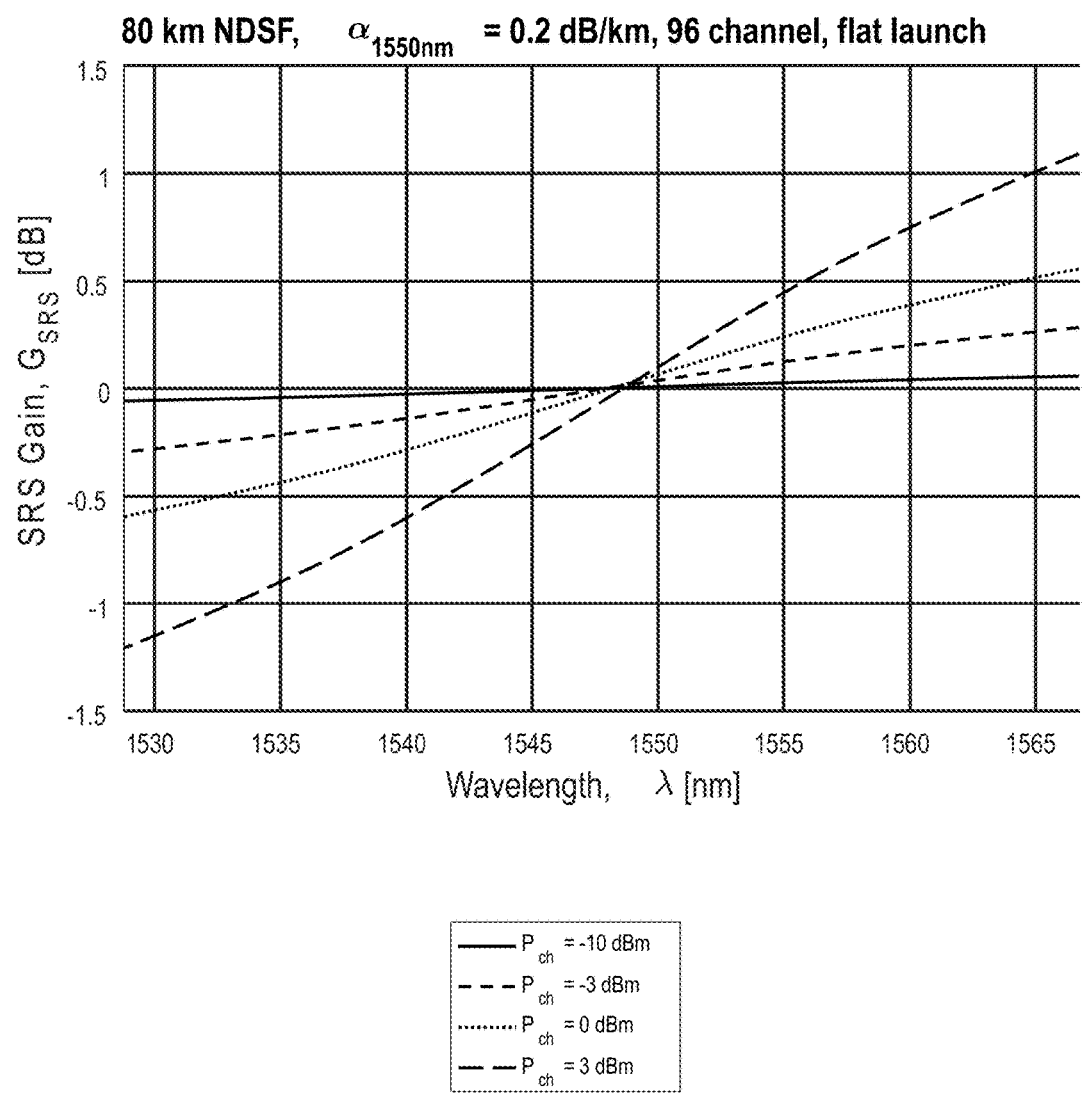
FIG. 3 is a graph of Stimulated Raman Scattering (SRS) gain versus wavelength for an example optical section with a single 80 km fiber span.

FIG. 3 is a graph of Stimulated Raman Scattering (SRS) gain versus wavelength for an example optical section. For example, the graph in FIG. 3 is for an 80 km Non-Dispersion Shifted Fiber (NDSF) section with attenuation of 0.2 dB/km at 1550 nm, 96 channels, and a flat launch power. The graph in FIG. 3 illustrates a transfer of gain from high-frequency channels to low-frequency channels and the magnitude of the gain tilt can be a function of total input power onto the fiber. SRS can contribute >1 dB tilt change per span over a large capacity change.

Amplifier Gain Ripple

Figure 4:
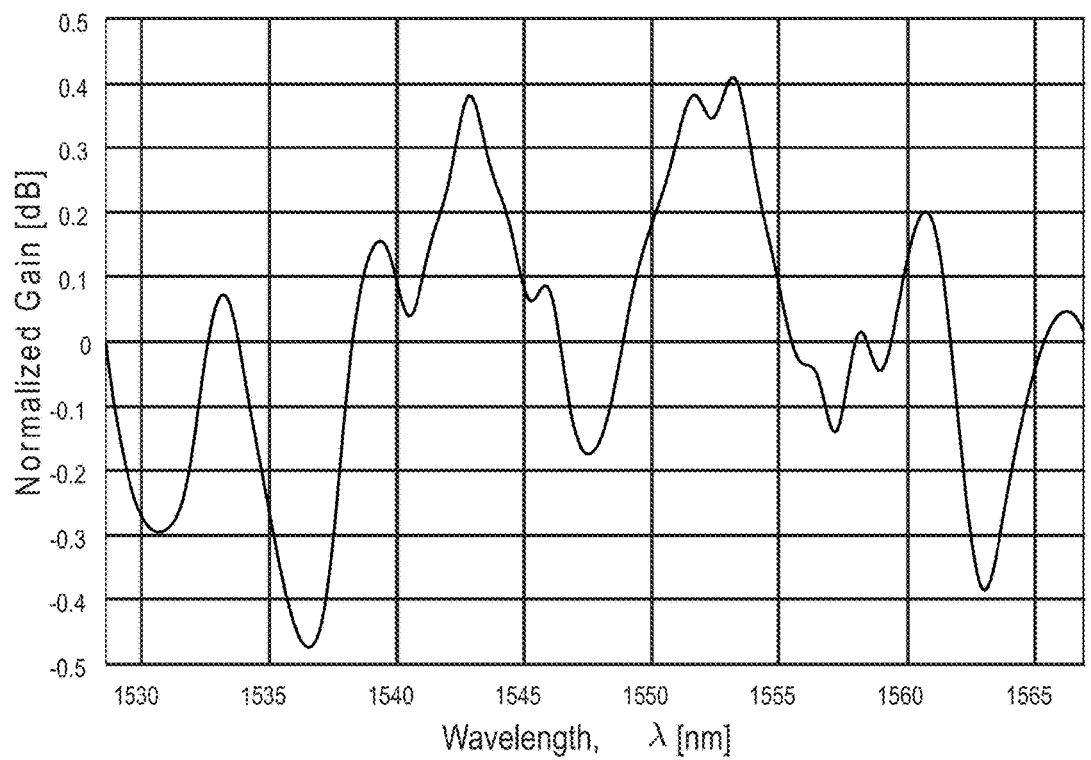
FIG. 4 is a graph of amplifier gain ripple versus wavelength for an example section with seven amplifiers.

FIG. 4 is a graph of amplifier gain ripple versus wavelength for an example section with seven amplifiers. Of note, amplifier gain ripple has a small effect on a per amplifier basis (~+/−0.2 dB) but can become appreciable after multiple amplifiers in cascade. For example, FIG. 4 is a graph showing seven amplifiers in a single 6-span domain.

Amplifier Gain Tilt

Figure 5:
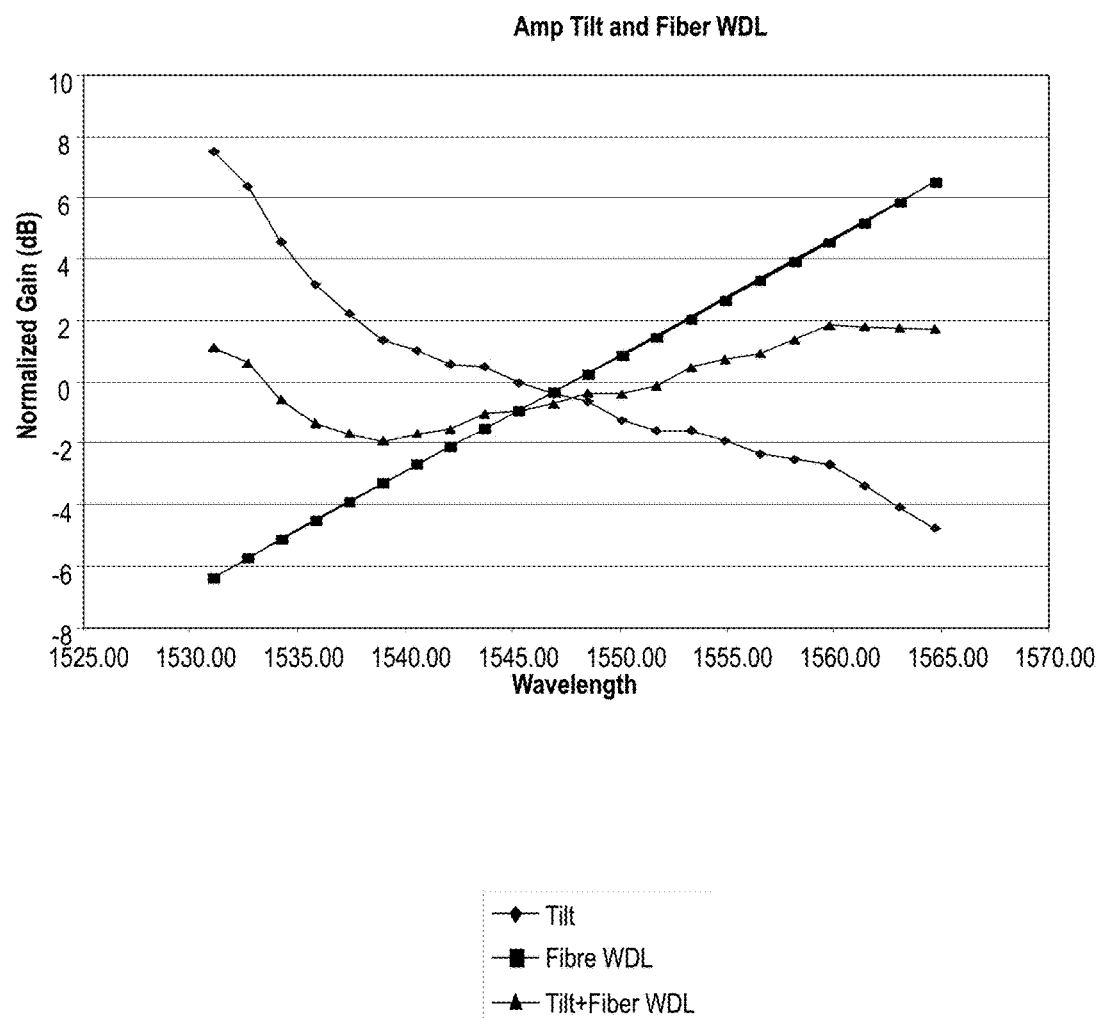
FIG. 5 is a graph of amplifier gain tilt, fiber Wavelength Dependent Loss (WDL), and a combination of the amplifier gain tilt and the fiber WDL versus wavelength for an example amplifier.

FIG. 5 is a graph of amplifier gain tilt, fiber Wavelength Dependent Loss (WDL), and a combination of the amplifier gain tilt and the fiber WDL versus wavelength for an example amplifier. Amplifier gain tilt is a static parameter which is provisioned to counteract fiber WDL at full fill. For a small dense cluster of channels there is effectively no tilt, but as there are channels at further separation, more tilt is experienced.

Spectral Hole Burning

Figure 6:
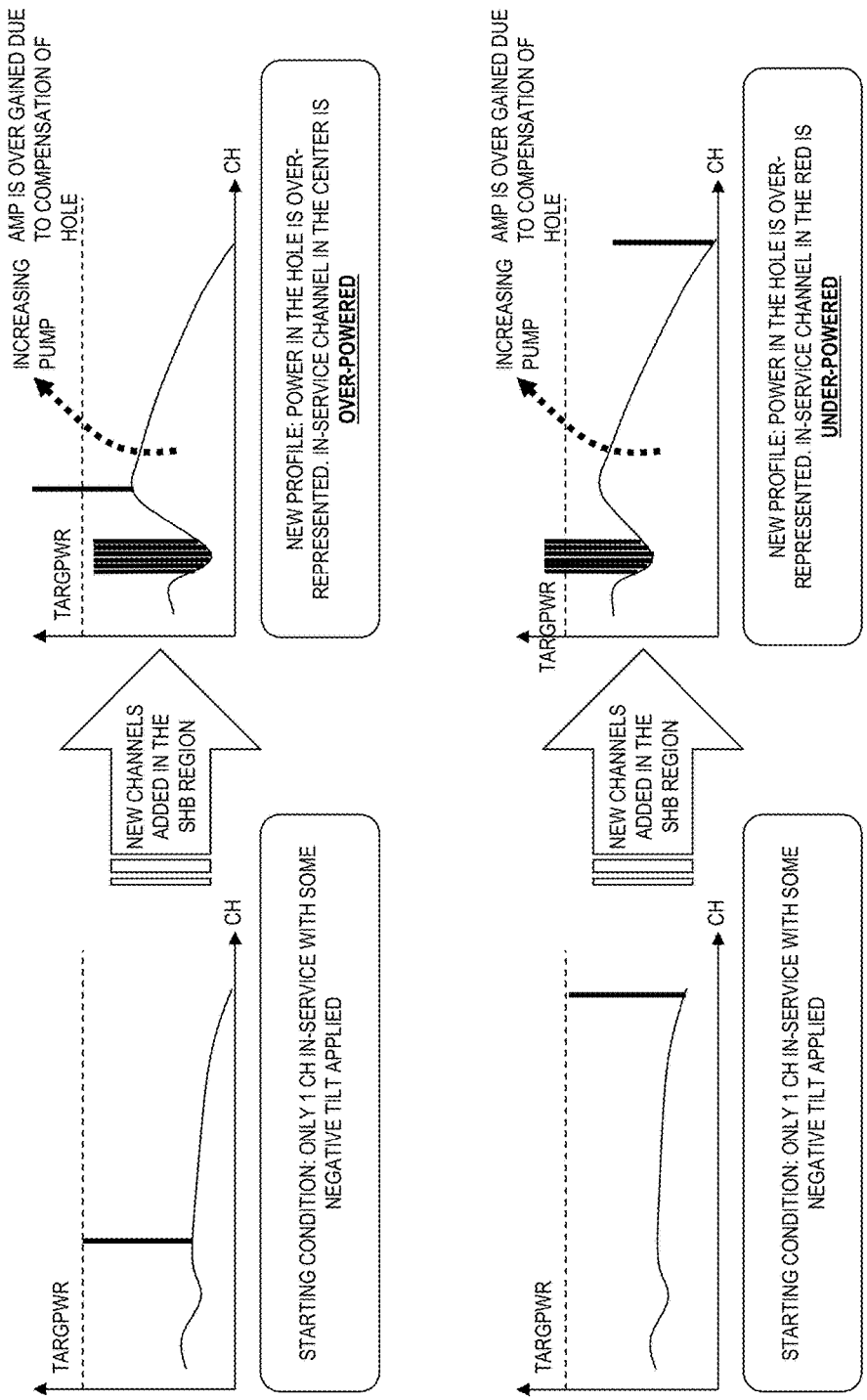
FIG. 6 are graphs illustrating how Spectral Hole Burning (SHB) affects in-service channels over a capacity change.

FIG. 6 are graphs illustrating how Spectral Hole Burning (SHB) affects in-service channels over a capacity change. Specifically, two graphs on the left side of FIG. 6 illustrate a starting condition with only one channel in-service with some negative gain tilt applied. The graphs on the right show new channels added in an SHB region and corresponding over-powering and under-powering of the in-service channels after the new channels are added.

Considerations for Channel Capacity Changes

When adding (or restoring) channels to a link, the following considerations are observed. Because of the physical effects of the perturbations, it is difficult to predict the final end condition, and the correct target level has to be estimated for the new channels. Once a target is decided, there must be an approach to achieve the target. For a loss target, the complication here is that to calculate a loss target, the upstream power must be stable (controller converged) and this requires setting pixel losses sequentially. For a power target, this allows more parallel or pseudo-parallel actions to occur. However, having multiple controllers ramping to a power target at the same time can lead to oscillations if being too aggressive.

Modeling

To counteract the nonlinear gain transfers over a capacity change and allow the system to make changes quickly without any performance impacts, the systems and methods use measured data from the system to generate key modeling parameters and pre-estimate what the optimal state will be after the capacity change so we can change actuators appropriately without requiring significant effort re-optimizing the system after a capacity change.

One approach for the model would be to treat each nonlinear effect as a separable perturbation on the mostly linear transfer function of the system. In this way, the expected gain perturbation can be quickly computed on an OMS-by-OMS basis and changes locally applied to give the desired transfer function of the system for state (2):

$$\Delta G_{OMS-k,dB}(v) \approx \sum_{i=1}^{NumSpans} \Delta G_{SRS-i,dB}(v) + \sum_{j=1}^{NumEDFAs} (\Delta G_{SHB-j,dB}(v) + \Delta G_{ripple-j,dB}(v) + \Delta G_{tilt-j,dB}(v))$$

Where:
  $\Delta G_{OMS-k,dB}(v)$ is the change in gain as a function of frequency in the $k^{th}$ OMS
  $\Delta G_{SRS-i,dB}(v)$ is the calculated change due to SRS over the capacity change based on fiber data measured or inferred from system as well as knowledge of which channels will be added and very basic assumptions about how that will affect total power onto the fiber—required inputs given below for SRS simple tilt modeling
  $\Delta G_{SHB-j,dB}(V)$ is the calculated change due to spectral hole burning based on spectral loading change.
  $\Delta G_{ripple-j,dB}(v)$ and $\Delta G_{tilt-j,dB}(v)$ are the net gain changes in the EDFA and can be calculated based on factory measured data or inferred from system measurements.

SRS Simple Tilt Monitoring

The dominant nonlinear gain effect in a fiber is due to stimulated (Stokes) Raman scattering (SRS) which can be represented as a vector of coupled ordinary differential equations (ODEs) as follows:

$$\frac{dP_n}{dz} = \left[-\alpha_n + \sum_k G_{nk} P_k\right] d_n P_n,$$

Where:
  $P_n$ is the power in the $n^{th}$ channel in linear units
  n indicates the channel number/index
  $\alpha_n$ is the loss of the fiber on the $n^{th}$ channel [km$^{-1}$]
  $d_n$ is either +1 (forward propagating) or −1 (counter-propagating)
  $G_{nk}$ is a matrix of gain values which is fiber type dependent A solution to the ODEs can be approximated using a single step Euler method using the average effective length defined by:

$$\langle L_{eff,km}\rangle = \int_0^L e^{-\langle \alpha_{Np/km}\rangle L_{km}} dz = \frac{1-e^{-\langle \alpha_{Np/km}\rangle \cdot L_{km}}}{\langle \alpha_{Np/km}\rangle} = 10 \cdot \left(\frac{1-10^{-\frac{\langle \alpha_{dB/km}\rangle \cdot L_{km}}{10}}}{\langle \alpha_{dB/km}\rangle \cdot \ln(10)}\right).$$

Then using a single step Euler method, the output power of the fiber can be approximated as simply:

$$P_{out,n} \approx \left[1 - \alpha_{n,\frac{dB}{km}} \cdot L_{km} \cdot \frac{\ln(10)}{10} + \langle L_{eff,km}\rangle \cdot \sum_k G_{nk} P_{in,k}\right] \cdot P_{in,n}.$$

Figure 7:
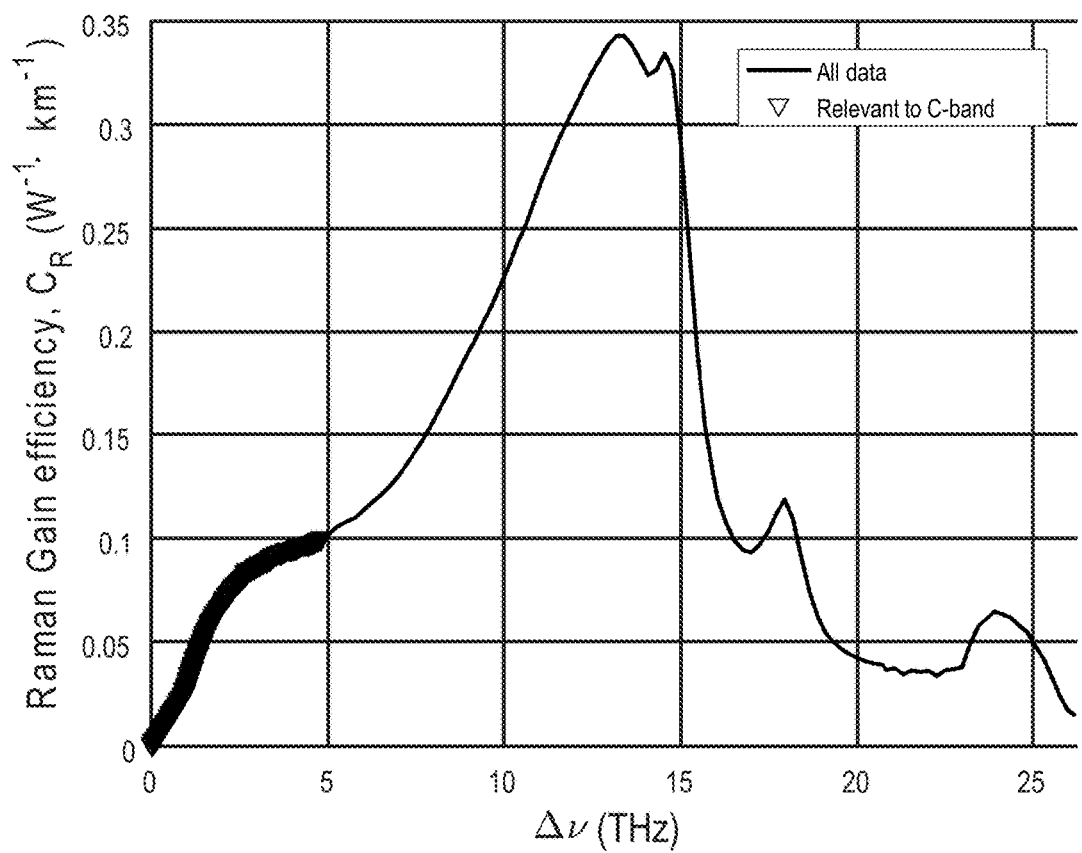
FIG. 7 is a graph of Raman gain efficiency as a function of frequency separation between a pump and probe signal.

This is now only considering forward propagating signals, i.e., signal-to-signal SRS; however, the SRS gain tilt characteristic changes of the transfer function for nearly fixed counter-propagating pumps are generally dominated by the signal-to-signal SRS The gain matrix is given by:

$$\overline{\overline{G_{nk}}} = \begin{bmatrix} 0 & C_r(v_2-v_1) & \dots & C_r(v_N-v_1) \\ -\frac{v_2}{v_1} \cdot C_r(v_2-v_1) & 0 & \dots & C_r(v_N-v_1) \\ \vdots & \vdots & \ddots & \vdots \\ -\frac{v_N}{v_1} \cdot C_r(v_N-v_1) & -\frac{v_N}{v_2} \cdot C_r(v_N-v_2) & \dots & 0 \end{bmatrix},$$

Where $C_r$ is fiber type dependent and also varies with pump wavelength due to change in overlap integral between pump and probe modes (an example is shown in FIG. 7 for NDSF in C-band which is a graph of Raman gain efficiency).

For a fast, simple model the following approximations can be assumed. The Raman gain efficiency curve is approximately linear and the difference between any two frequencies in the bands we transmit in (e.g., C-band), are negligible $$\left(\text{i.e. } \frac{v_N}{v_1} \approx 1\right)$$

which is reasonable in C-band (<3% error) or C+L bands (<10% error).

With these approximations, the gain matrix can be approximated as simply:

$$\overline{\overline{G_{nk}}} \approx \langle g_v\rangle_{C-band} \cdot \begin{bmatrix} 0 & v_2-v_1 & \dots & v_N-v_1 \\ v_1-v_2 & 0 & \dots & v_N-v_2 \\ \vdots & \vdots & \ddots & \vdots \\ v_1-v_N & v_2-v_N & \dots & 0 \end{bmatrix},$$

Where:

$$\langle g_v\rangle_{C-band} = \frac{\int_0^{\Delta v_{C-band}} \frac{C_r(\Delta v)}{\Delta v} d(\Delta v)}{\Delta v_{C-band}}.$$

Since the SRS gain curve is smooth (i.e., the $C_r$ curve can be approximated as linear, translating into linear gain tilt), a single calculation can be performed for the tilt across the C-band and interpolate (if necessary) to find what the gain transfer function due to SRS is at multiple frequencies. The transfer function due to SRS in this approximation is given at a single frequency by:

$$G_{SRS,n} = 1 + \langle L_{eff,km}\rangle \cdot \sum_k G_{nk} P_{in,k}.$$

To find the tilt across a bandwidth (C-band in this example), the matrix $G_{nk}$ can be collapsed to only look at two frequencies at the start/end of the frequency band of interest and apply weights to the amount of power at each point to represent the total power within each half of the band of interest, i.e., $$\overline{G_{nk}} \approx \langle g_v \rangle_{C\text{-}band} \cdot \begin{bmatrix} 0 & v_{end} - v_{start} \\ v_{start} - v_{end} & 0 \end{bmatrix},$$

Where:

$$P_{in,v_{start}} = \int_{v_{start}}^{\frac{v_{start}+v_{end}}{2}} PSD_{in}(v)dv \text{ and } P_{in,v_{end}} = \int_{\frac{v_{start}+v_{end}}{2}}^{v_{end}} PSD_{in}(v)dv.$$

The tilt in dB due to SRS referenced with increasing wavelength (decreasing frequency) can be defined as simply the ratio of gains at either end of the spectrum using the weighted powers discussed above:

$$Tilt_{dB} = 10 \cdot \log_{10}\left(\frac{G_{SRS,start}}{G_{SRS,end}}\right) = 10 \cdot \log_{10}\left(\frac{1 + T_f \cdot COM_{PSD} \cdot \text{TIP}}{1 - T_f \cdot (1 - COM_{PSD}) \cdot \text{TIP}}\right),$$

Where:

$$T_f = \Delta v_{C\text{-}band} \cdot \langle g_v \rangle_{C\text{-}band} \cdot 10 \cdot \left(\frac{1 - 10^{-\frac{\langle \alpha_{dB/km} \rangle \cdot L_{km}}{10}}}{\langle \alpha_{dB/km} \rangle \cdot \ln(10)}\right)$$

$$COM_{PSD} = \frac{\frac{\int_{v_{start}}^{v_{end}} v \cdot PSD(v)dv}{\int_{v_{start}}^{v_{end}} PSD(v)dv} - v_{start}}{\Delta v_{C\text{-}band}}$$

is a normalized center of mass between the start/end of C-band (between 0 and 1). Much simpler calculations can be done just based on channel plan if necessary, or even just use a value of 0.5 everywhere without significant error.

TIP is the total input power into the fiber in linear units.

Figure 8:
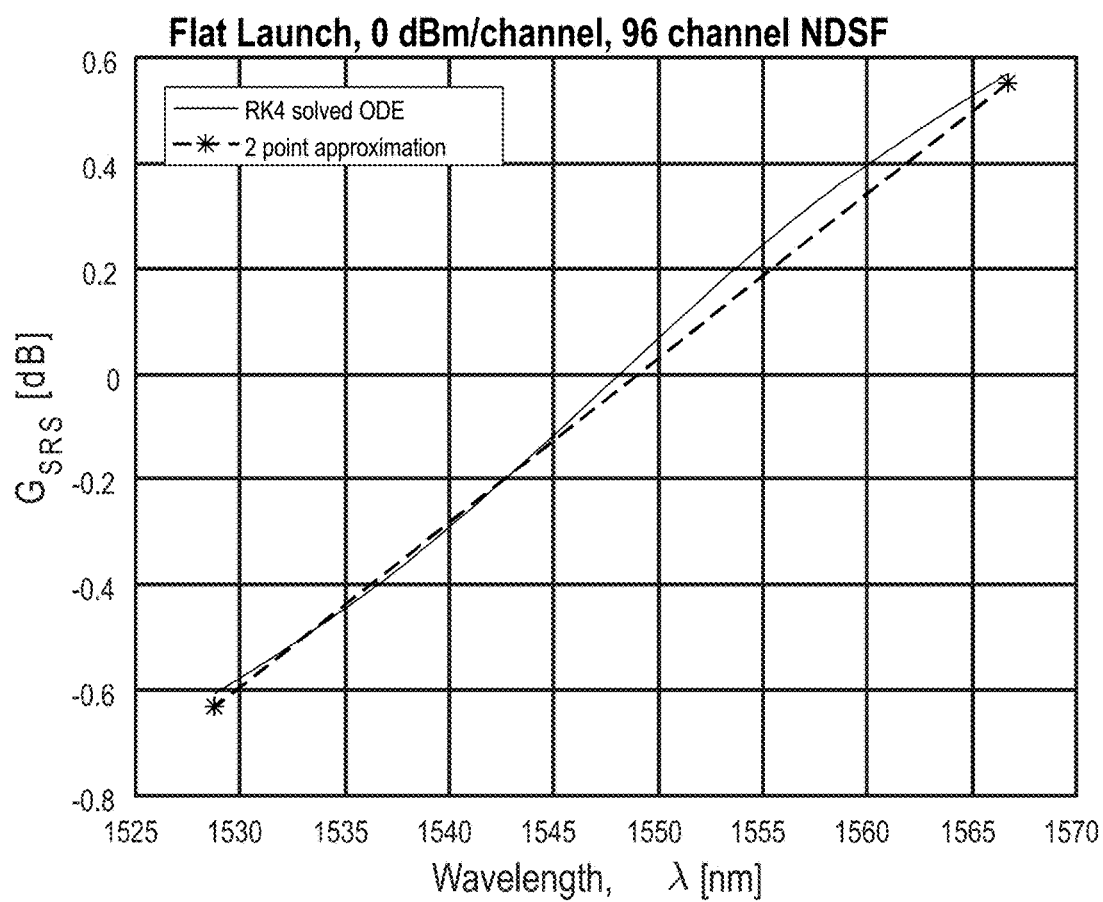
FIG. 8 is a graph illustrating the effectiveness of SRS gain modeling as a line which utilizes the very simple and efficient equation derived herein.

FIG. 8 is a graph illustrating the effectiveness of SRS gain modeling as a line which utilizes the very simple and efficient equation derived herein. In this simulation, it is assumed NDSF fiber, 0.2 dB/km loss at 1550 nm, Flat launch, 0 dBm/channel, 96 channels on ITU grid. The effectiveness of this approach has been validated for many different loading conditions as demonstrated by the success of using it for nonlinear preconditioning.

Spectral Hole Burning

SHB is characterized by various assumptions, derivations, and modeling steps. To that end, a simplified, fast and efficient SHB modeling relation was developed—the gain perturbation can be treated as separable from the rest of the EDFA gain modeling to first order. This allows the model to determine how the nonlinear gain perturbation will change from state 1 to state 2 loading considering SHB.

Figure 9:
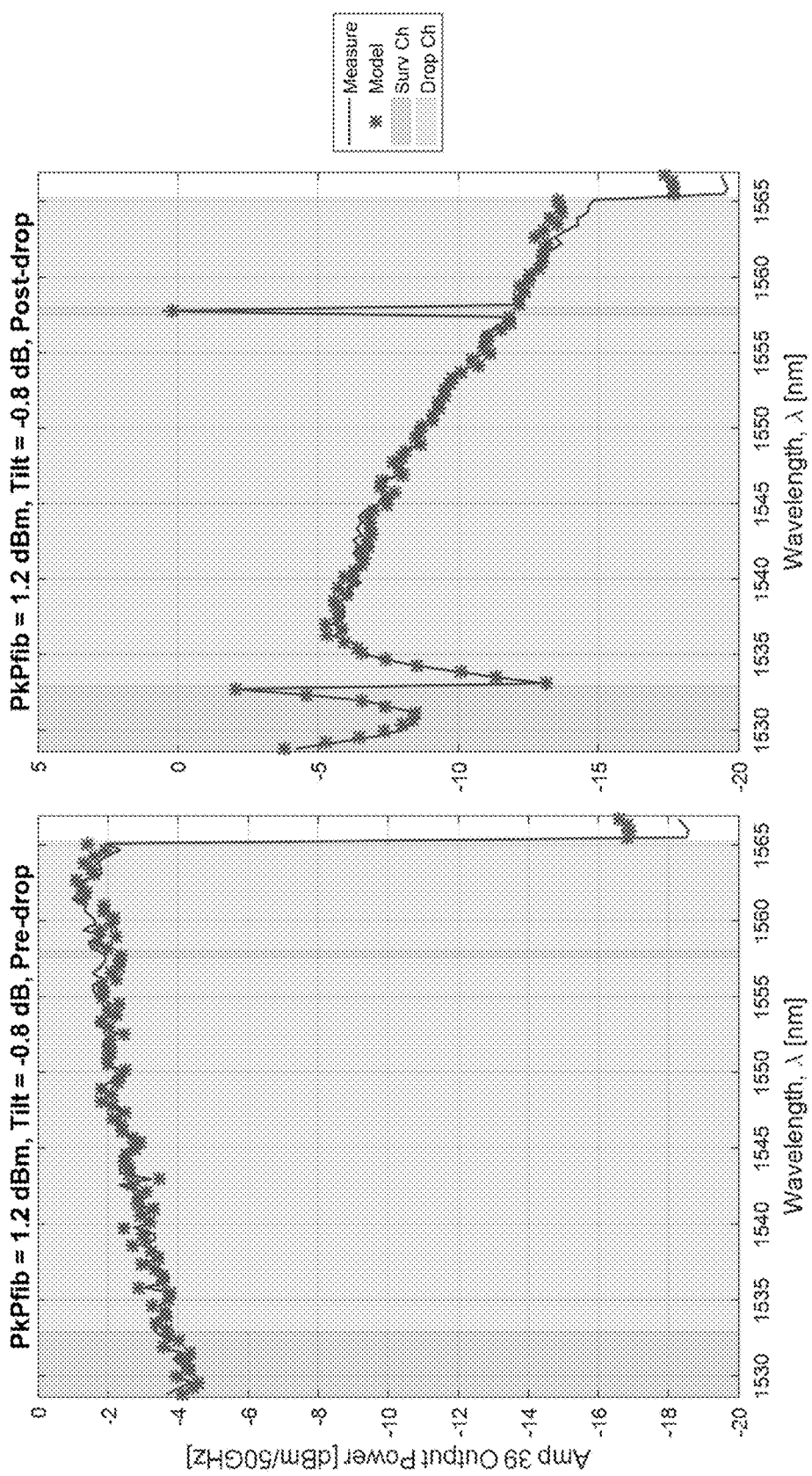
FIG. 9 is graphs of a sample model line-up versus a real measurement of a channel delete showing the predicted state (1) and (2) power profiles considering all nonlinear gain perturbations.

FIG. 9 is graphs of a sample model line-up versus a real measurement showing the predicted state (1) and (2) power profiles considering all nonlinear gain perturbations (for 33 spans and 39 EDFAs, through 6 OMSs).

Simulation Example

Figure 10:
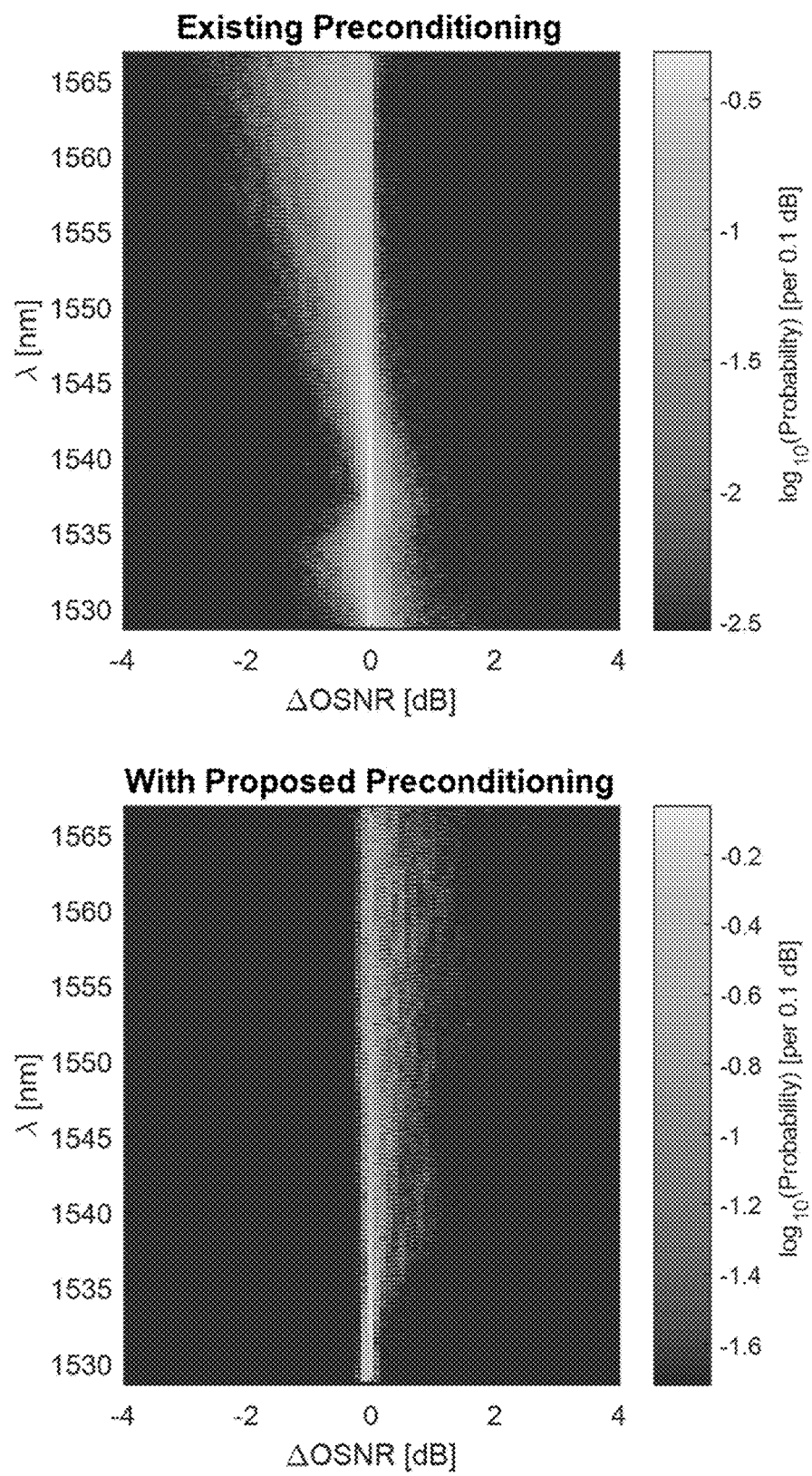
FIG. 10 are two graphs illustrating OSNR impact at the end of a three-section system without and with preconditioning considering nonlinear gain transfer.

FIG. 10 are two graphs illustrating OSNR impact at the end of a three-section system without and with preconditioning. The three-section system has 6 spans/section of NDSF fiber (85 km/span, 0.22 dB/km at 1550 nm), peak power target at fiber input of −3 dBm/12.5 GHz (1.5 dBm/channel flex grid control). For simulation, more than 2000 unique add cases were performed. All relevant physical effects were modeled (NF shape as a function of all EDFA parameters, EDFA gain, ripple, dynamic gain tilt, SHB, SRS, WSS shaping, etc.).

Preconditioning Process

Figure 11:
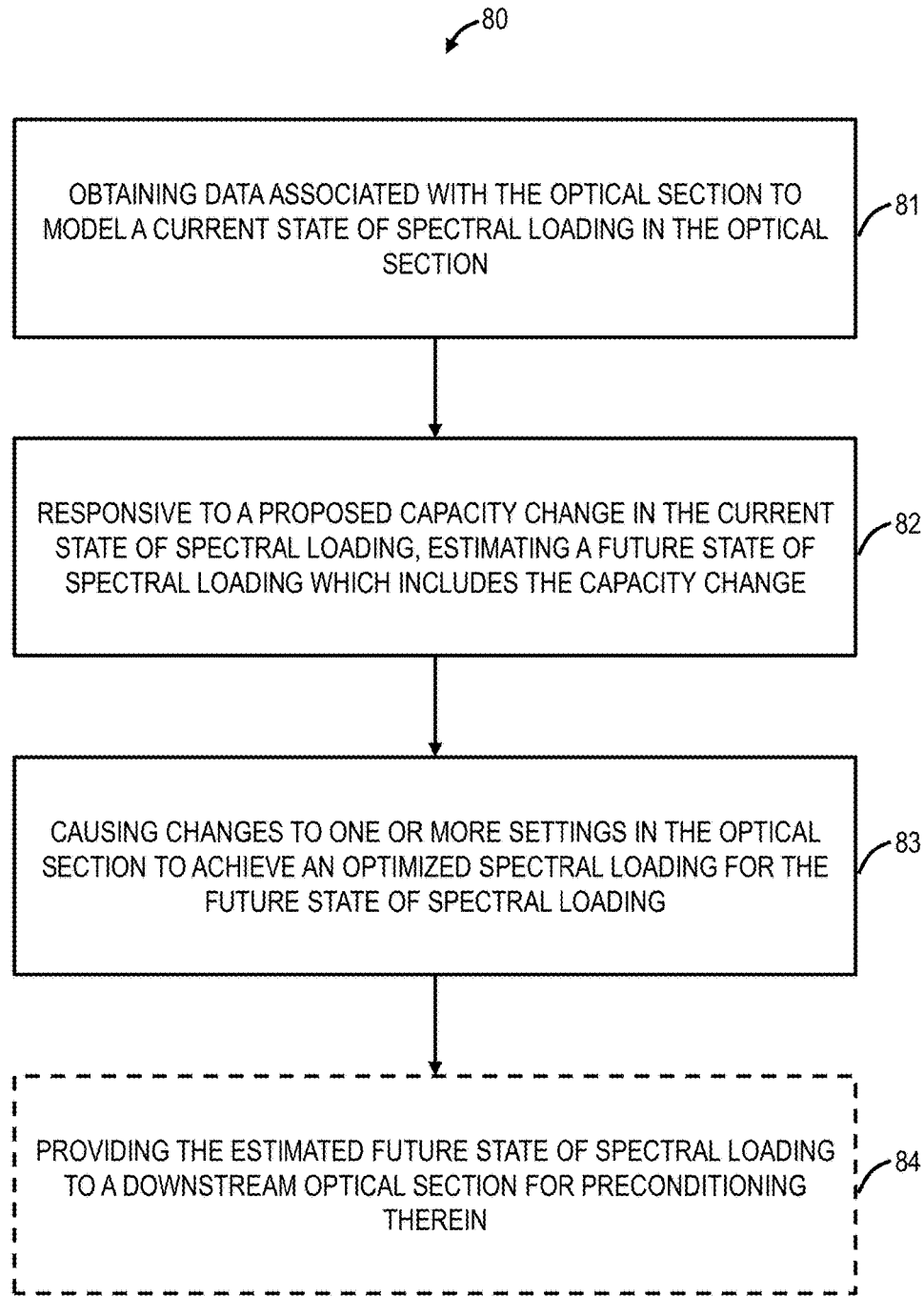
FIG. 11 is a flowchart of a process for preconditioning optical spectrum through predicting optical spectral profiles in advance of capacity changes in an optical section.

FIG. 11 is a flowchart of a process 80 for preconditioning optical spectrum through predicting optical spectral profiles in advance of capacity changes in an optical section. The process 80 includes obtaining data associated with the optical section to model a current state of spectral loading in the optical section (step 81); responsive to a proposed capacity change in the current state of spectral loading, estimating a future state of spectral loading which includes the capacity change (step 82); and causing changes to one or more settings in the optical section to achieve an optimized spectral loading for the future state of spectral loading (step 83). The process 80 can also include providing the estimated future state of spectral loading to a downstream optical section for preconditioning therein (step 84).

The proposed capacity change can be implemented subsequent to the changes to the one or more settings in the optical section. The changes can be provided to one or more actuators in the optical section. The estimating can include determining a change in the future state of spectral loading due to Stimulated Raman Scattering (SRS), due to Spectral Hole Burning (SHB), amplifier gain ripple, and amplifier gain tilt. The estimating can treat each nonlinear effect as a separable perturbation in an approximately linear transfer function to determine the estimated future state of spectral loading. The process 80 can be implemented via a controller connected to the optical section. The proposed capacity change can include adding one or more channels to the optical section.

Controller

Figure 12:
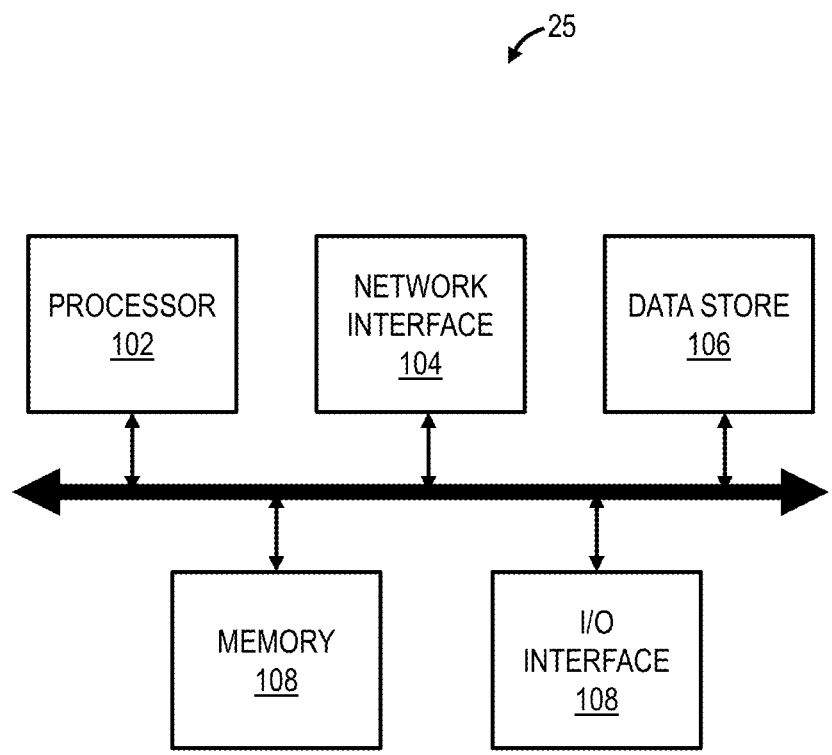
FIG. 12 is a block diagram of an example controller.

FIG. 12 is a block diagram of an example controller 25. The controller 25 can be part of common equipment at a network element, such as the nodes 12, 14, or a stand-alone device communicatively coupled to the network element. The controller 25 can include a processor 102 which is a hardware device for executing software instructions such as operating the control plane. The processor 102 can be any custom made or commercially available processor, a central processing unit (CPU), an auxiliary processor among several processors associated with the controller 25, a semiconductor-based microprocessor (in the form of a microchip or chip set), or generally any device for executing software instructions. When the controller 25 is in operation, the processor 102 is configured to execute software stored within the memory, to communicate data to and from the memory, and to generally control operations of the controller 25 pursuant to the software instructions. The controller 25 can also include a network interface 104, a data store 106, memory 108, an I/O interface 110, and the like, all of which are communicatively coupled to one another and to the processor 1002.

The network interface 104 can be used to enable the controller 25 to communicate on a data communication network, such as to communicate information to other controllers, and the like. The network interface 104 can include address, control, and/or data connections to enable appropriate communications on the network. The data store 106 can be used to store data, such as control plane information, provisioning data, Operations, Administration, Maintenance, and Provisioning (OAM&P) data, etc. The data store 106 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 106 can incorporate electronic, magnetic, optical, and/or other types of storage media. The memory 108 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 108 may incorporate electronic, magnetic, optical, and/or other types of storage media. Note that the memory 108 can have a distributed architecture, where various components are situated remotely from one another but may be accessed by the processor 102. The I/O interface 110 includes components for the controller 25 to communicate with other devices. Further, the I/O interface 110 includes components for the controller 25 to communicate with the other nodes.

In an embodiment, the controller 25 is connected to the optical section 10 and configured to precondition optical spectrum through predicting optical spectral profiles in advance of capacity changes in the optical section. The controller 25 can include memory storing instructions that, when executed, cause the processor 102 to obtain data associated with the optical section to model a current state of spectral loading in the optical section; estimate a future state of spectral loading which includes the capacity change responsive to a proposed capacity change in the current state of spectral loading; and cause changes to one or more settings in the optical section to achieve an optimized spectral loading from the future state of spectral loading.

The proposed capacity change can be implemented subsequent to the changes to the one or more settings in the optical section. The changes can be provided to one or more actuators in the optical section 10. The estimated future state of spectral loading can be based on a determination of a change in the future state of spectral loading due to Stimulated Raman Scattering (SRS), due to Spectral Hole Burning (SHB), amplifier gain ripple, and amplifier gain tilt. The estimated future state of spectral loading can treat each nonlinear effect as a separable perturbation in an approximately linear transfer function to determine the estimated future state of spectral loading. The memory storing instructions that, when executed, can further cause the processor to provide the estimated future state of spectral loading to a downstream optical section for preconditioning therein.

In another embodiment, an apparatus connected to an optical section and configured to precondition optical spectrum through predicting optical spectral profiles in advance of capacity changes in the optical section includes circuitry configured to obtain data associated with the optical section to model a current state of spectral loading in the optical section; circuitry configured to estimate a future state of spectral loading which includes the capacity change responsive to a proposed capacity change in the current state of spectral loading; and circuitry configured to cause changes to one or more settings in the optical section to achieve an optimized spectral loading from the future state of spectral loading.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for preconditioning optical spectrum through predicting optical spectral profiles in advance of capacity changes in an optical section, the method comprising:

obtaining data associated with the optical section to model a current state of spectral loading in the optical section;

responsive to a proposed capacity change in the current state of spectral loading, estimating a future state of spectral loading which includes the capacity change to predict required changes in the spectral loading before the proposed capacity change takes place; and causing changes to one or more settings in the optical section to achieve an optimized spectral loading for the future state of spectral loading.

2. The method of claim 1, wherein the proposed capacity change is implemented subsequent to the changes to the one or more settings in the optical section.

3. The method of claim 1, wherein the changes are provided to one or more actuators in the optical section.

4. The method of claim 1, wherein the estimating comprises determining a change in the future state of spectral loading due to Stimulated Raman Scattering (SRS), Spectral Hole Burning (SHB), amplifier gain ripple, and amplifier gain tilt.

5. The method of claim 1, wherein the estimating treats each nonlinear effect as a separable perturbation in an approximately linear transfer function to determine the estimated future state of spectral loading.

6. The method of claim 1, wherein the estimating utilizes interpolation/extrapolation of already in-service channels' power.

7. The method of claim 1, further comprising:
providing the estimated future state of spectral loading to a downstream optical section for preconditioning therein.

8. The method of claim 1, wherein the method is implemented via a controller connected to the optical section.

9. A controller connected to an optical section and configured to precondition optical spectrum through predicting optical spectral profiles in advance of capacity changes in the optical section, the controller comprising:

a processor; and memory storing instructions that, when executed, cause the processor to
obtain data associated with the optical section to model a current state of spectral loading in the optical section,
estimate a future state of spectral loading which includes the capacity change responsive to a proposed capacity change in the current state of spectral loading to predict required changes in the spectral loading before the proposed capacity change takes place, and
cause changes to one or more settings in the optical section to achieve an optimized spectral loading for the future state of spectral loading.

10. The controller of claim 9, wherein the proposed capacity change is implemented subsequent to the changes to the one or more settings in the optical section.

11. The controller of claim 9, wherein the changes are provided to one or more actuators in the optical section.

12. The controller of claim 9, wherein the estimated future state of spectral loading is based on a determination of a change in the future state of spectral loading due to Stimulated Raman Scattering (SRS), due to Spectral Hole Burning (SHB), amplifier gain ripple, and amplifier gain tilt.

13. The controller of claim 9, wherein the estimated future state of spectral loading treats each nonlinear effect as a separable perturbation in an approximately linear transfer function to determine the estimated future state of spectral loading.

14. The controller of claim 9, wherein the memory storing instructions that, when executed, further cause the processor to
provide the estimated future state of spectral loading to a downstream optical section for preconditioning therein.

15. An apparatus connected to an optical section and configured to precondition optical spectrum through predicting optical spectral profiles in advance of capacity changes in the optical section, the apparatus comprising:

circuitry configured to obtain data associated with the optical section to model a current state of spectral loading in the optical section;

circuitry configured to estimate a future state of spectral loading which includes the capacity change responsive to a proposed capacity change in the current state of spectral loading to predict required changes in the spectral loading before the proposed capacity change takes place; and circuitry configured to cause changes to one or more settings in the optical section to achieve an optimized spectral loading for the future state of spectral loading.

16. The apparatus of claim 15, wherein the proposed capacity change is implemented subsequent to the changes to the one or more settings in the optical section.

17. The apparatus of claim 15, wherein the changes are provided to one or more actuators in the optical section.

18. The apparatus of claim 15, wherein the estimated future state of spectral loading is based on a determination of a change in the future state of spectral loading due to Stimulated Raman Scattering (SRS), due to Spectral Hole Burning (SHB), amplifier gain ripple, and amplifier gain tilt.

19. The apparatus of claim 15, wherein the estimated future state of spectral loading treats each nonlinear effect as a separable perturbation in an approximately linear transfer function to determine the estimated future state of spectral loading.

20. The apparatus of claim 15, further comprising:
circuitry configured to provide the estimated future state of spectral loading to a downstream optical section for preconditioning therein.

* * * * *